United States Patent [19]
Attenborough

[11] 3,869,729
[45] Mar. 11, 1975

[54] BONE JOINT PROSTHESIS

[75] Inventor: Christopher George Attenborough, Winchelsea, England

[73] Assignee: National Research Development Corporation, London, England

[22] Filed: Dec. 29, 1972

[21] Appl. No.: 319,480

[30] Foreign Application Priority Data
Jan. 5, 1972  Great Britain .................. 484/72
Apr. 17, 1972  Great Britain .................. 17610/72

[52] U.S. Cl. .................................. 3/1, 128/92 C
[51] Int. Cl. .......................................... A61f 1/24
[58] Field of Search ..... 3/1; 128/92 C, 92 CA, 92 R

[56] References Cited
UNITED STATES PATENTS

| | | | |
|---|---|---|---|
| 3,506,982 | 4/1970 | Steffee | 3/1 |
| 3,638,243 | 2/1972 | Campbell, Jr. et al. | 3/1 |
| 3,694,821 | 10/1972 | Moritz | 3/1 |
| 3,696,446 | 10/1972 | Bousquet et al. | 3/1 |
| 3,728,742 | 4/1973 | Averill et al. | 3/1 |
| 3,760,427 | 9/1973 | Schultz | 3/1 |
| 3,765,033 | 10/1973 | Goldberg et al. | 3/1 |

Primary Examiner—Ronald L. Frinks
Attorney, Agent, or Firm—Cushman, Darby & Cushman

[57] ABSTRACT

An endoprosthetic bone joint device, suitable for the knee or other joints, is provided by way of two components of which one is slotted to receive in captive rotatable engagement therein a linkage member projecting from the other. In the direction of the slot, the slotted component has a generally convex bearing surface which engages a similarly directed concave bearing surface on the other component, but in an orthogonal direction the former surface can present two raised portions to engage respective depressions in the latter surface and resulting in a rib and groove along each side of the slot. This double rib - groove formation is appropriate to a knee joint device, but can be simplified to singular curvature for another joint such as a finger. Also, the lateral dimension of the slot can progressively vary to allow a progressively varying lateral rocking capability with rotation of the components.

10 Claims, 6 Drawing Figures

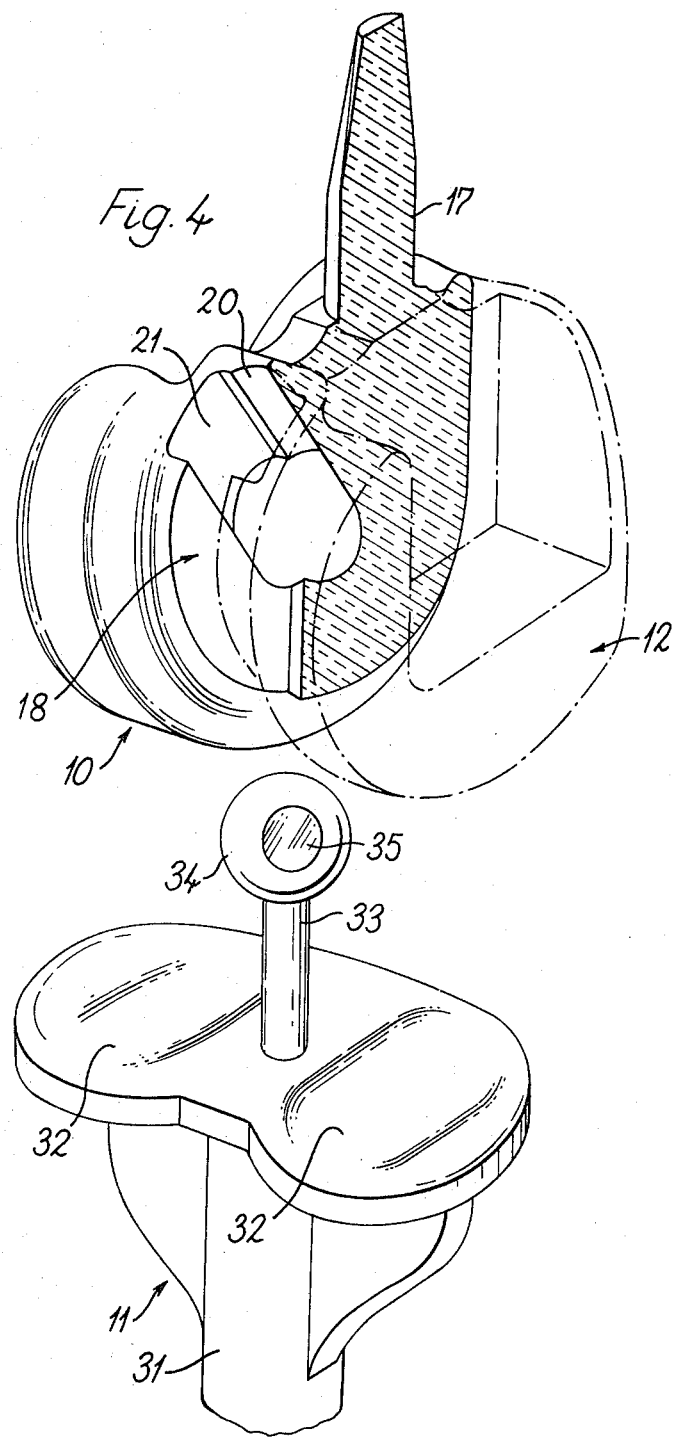

BONE JOINT PROSTHESIS

This invention concerns bone joint prostheses and more particularly, but not exclusively, endoprosthetic knee joint devices. The invention has in fact been developed primarily in relation to the knee joint and it is accordingly appropriate to described the invention principally in this context. However, it is to be understood that the invention can find application in relation to other joints.

Various proposals have been made in the past for knee joint endoprostheses and the majority of these proposals fall into one or other of two more general kinds.

The first of these kinds involve hinge devices and have been successful to a certain extent in terms of alleviation of pain and the provision of some flexion capability. However, these hinged prostheses are considered to suffer from certain disadvantages. For example, they are normally large and heavy, with a consequent requirement for significant removal of bone, and frequently removal of the patella and natural ligaments, for the purposes of implantation. At the same time, fixation of the prosthesis normally involves the use of long intramedullary stems. A further diadvantage is that the geometry of such hinge prostheses only allow rotation in a single plane (for flexion-extension movement) and this rotation involves a fixed centre of rotation. This contrasts with the more complicated rotational geometry of the natural joint.

The second kind of prostheses in question are of more recent origin and component to reduce the above disadvantages. They involve separate femoral and tibial components which are held together by the natural ligaments rather than by a direct mechanical hinge linkage, and so this second kind can be regarded as hingeless prostheses. However, hingeless knee prostheses have yet to be in use for a sufficiently long term for their theoretical advantages over the hinged kind to be proven and must be regarded as of clinical trial status. Accordingly, it remains to be seen whether the hingeless prostheses may not be subject to disadvantages of a different nature to those discussed above. For example, these latter prostheses may suffer from a lack of stability due to the absence of a direct mechanical linkage and to the normal requirement to remove the cruciate ligaments while retaining the collateral ligaments. Similarly, difficulty may arise in ensuring adequate register, as it were, between the separate components during implantation to ensure that the designed rotational geometry is functionally effective.

In this context the present invention provides a knee joint prosthesis which is neither of a hinged nor hingeless kind, but represents what can be regarded as a compromise between the two kinds.

More generally the present invention provides an endoprosthetic bone joint device comprising: a first components having a slot therein, and a first bearing surface extending around said recess, which surface has a generally convex profile in directions parallel to said slot; a second component having a second bearing surface in bearing engagement with said first bearing surface, which second surface has a generally concave profile in said directions; and a linkage member extending from said second component into said slot to mechanically couple said components; said components, on the one hand, and said linkage member and slot, on the other hand, being similarly relatively rotatable in the direction of said slot, said components, on the one hand, and said linkage member and one of said components, on the other hand, being similarly separable in at least one relative disposition of said components; and said components being individually adapted, remotely from their respective bearing surfaces, for securement to respectively different bones of said joint.

A device according to the invention is preferably of such a form that: when implanted, the components are captively coupled by way of the linkage member to allow relatively rotatable bearing engagement therebetween within an angular range corresponding to that of the relevant natural joint; but that, when not implanted, the components are capable of at least one relative disposition and movement whereby they are separable, with separation of the linkage member from one of the components, which disposition and movement is not normally possible in the natural joint. Implantation of such a device relies on the possibility of disposing and moving the bones of the joint to an increased extent, when the implantation site is exposed and not subject to the normal restraints of encapsulation, whereby the components can be separately fixed to their bones and then coupled by the linkage member, or whereby one of the components can be fixed and the other component fixed thereafter while coupling the linkage member to the one component from the other. Subsequent closure of the site renders the components captively engaged, but free to move within the normal range of movement of the natural joint.

In a preferred form of this purpose: the slot is of generally segmentally tapered form as it extends into said first component but terminates therein in an enlarged cavity; and the linkage member includes a shaft projecting from said second component, and terminating in an enlarged head captively located in said cavity when the device is implanted.

This form of the invention is itself subject to variations in practical forms.

in one such variation the linkage member shaft can be fixed with the second component, and the linkage member head and/or the slot can be formed to permit engagement and disengagement of the head and the slot cavity only when the two components are in a relative disposition which does not correspond to a natural disposition of the relevant joint. In one example of this variation, the linkage member head is narrower in one direction which is inclined relative to that of said slot to allow sliding of the head in the slot only when the components are relatively twisted about an axis normal to their bearing surfaces to an extent not possible in the natural joint. In another example, the slot has an enlarged tunnel extending along one radial boundary of its segmental form to allow access of the head to and from the slot cavity, and the slot can be of greater segmental angular extent than the flexion range of the joint with the tunnel disposed outside the latter.

In another variation the linkage member head is secured in captive location in the slot cavity, and the linkage member shaft is longitudinally slidably received in a bore in the second component. In this case the longitudinal extent of the shaft/bore engagement is such that separation is only effected with a greater separation of the two components than is possible between the bones of the relevant joint.

A device as more generally proposed by the invention is also open to other variations. For example, in a knee joint device the bearing surfaces are preferably not of a completely conforming or complementary nature, but of such shapings as to afford a varying centre of rotation similar to that of the natural joint. In these and other ways such a device can be similar to the above-discussed hingeless kind. However, the presence of the linkage between the components of the assembled components renders it similar to the hinged kind in terms of stability but without constraining it to simple rotation about a fixed centre. Indeed, a feature of the present device is that the linkage member and its slot can allow variable-centre flexion-extension rotation, rotation about the longitudinal axis, and lateral rocking in a manner similar to the natural knee joint.

In order to further clarify the present invention, the same will now be more fully described by way of example with reference to the accompanying drawings, in which:

FIG. 4 is another perspective view, partly broken away, of the same embodiment with its components disengaged and mutually disposed in positions corresponding to full extension, this view being taken from behind and below corresponding to a posterior-inferior sense;

Figure 3:
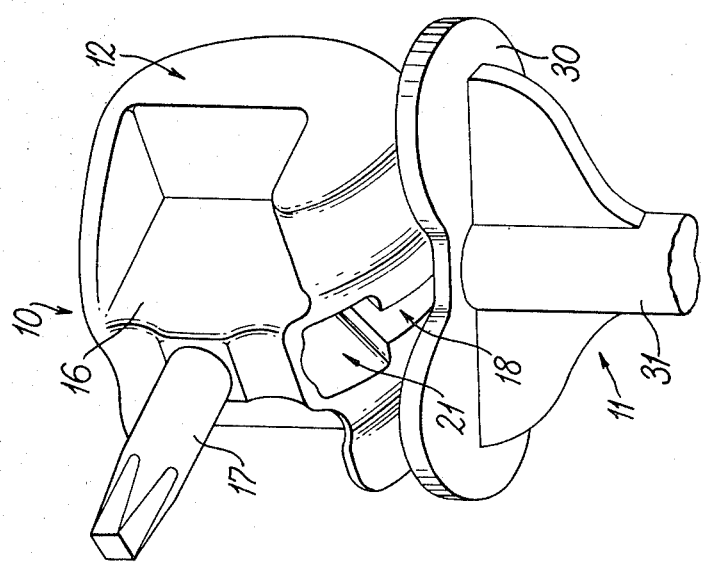
FIG. 3 is a perspective view of the embodiment of FIGS. 1 and 2 with its components captively engaged in the configuration corresponding to about 90° flexion, the view being taken from behind and above corresponding to a posterior-superior sense.
Figure 2:
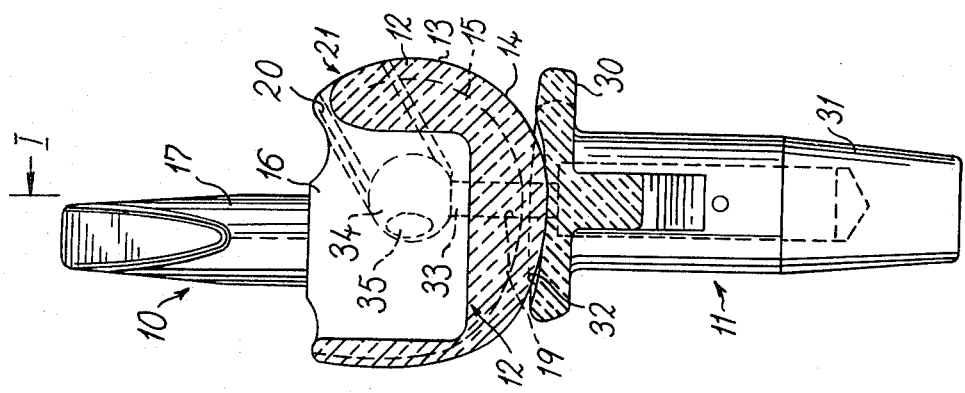
FIGS. 1 and 2 illustrate one embodiment of a knee joint device according to the invention in partly-sectioned, respectively orthogonal side views corresponding to posterior and lateral views and with its components captively engaged and in the configuration corresponding to full extension.

The first illustrated embodiment has femoral and tibial components respectively denoted at 10 and 11.

The femoral component comprises a bearing member 12 which is generally U-shaped in the lateral aspect, the outer surface 13 of this member being of smooth generally convex shaping in the lateral aspect. More particularly, this surface simulates the shaping of the femoral condyles by the provision of an appropriate spirally arcuate shaping in the lateral aspect, and in the anterior aspect a rounded shaping having two convex portions 14 separated by a trough 15 passing centrally around the U-shaping.

The femoral bearing member has a web 16 spanning the interior space of the U-shaping and disposed within the plane of the trough 15. A tapered intramedullary stem 17 extends from the web 16, as shown.

Lastly in the basic construction of the femoral component, it remains to consider the linkage member receiving recess. This recess takes the form of a generally segmentally shaped slot 18 disposed in the plane of the trough and web, with the curved boundary of the segmental shaping being defined by the trough and the radial boundaries of such shaping passing through the bearing member 12 to meet in the web 16. As will be appreciated more fully hereinafter, the surfaces defining the radial boundaries of the slot 18 serve as stops to define the limits of relative movement between the femoral and tibial components. In this connection, one such radial boundary surface 19 extends approximately parallel with the stem 17 to define the limit in the sense of full extension, although there may be a small angular difference between the longitudinal directions of this side and stem to allow for slight hyperextension. The other radial boundary surface 20 extends towards the posterior of the femoral component, with the slot subtending an angle greater than 90°, about 110° say, to define the limit in the sense of full flexion.

Figure 1:
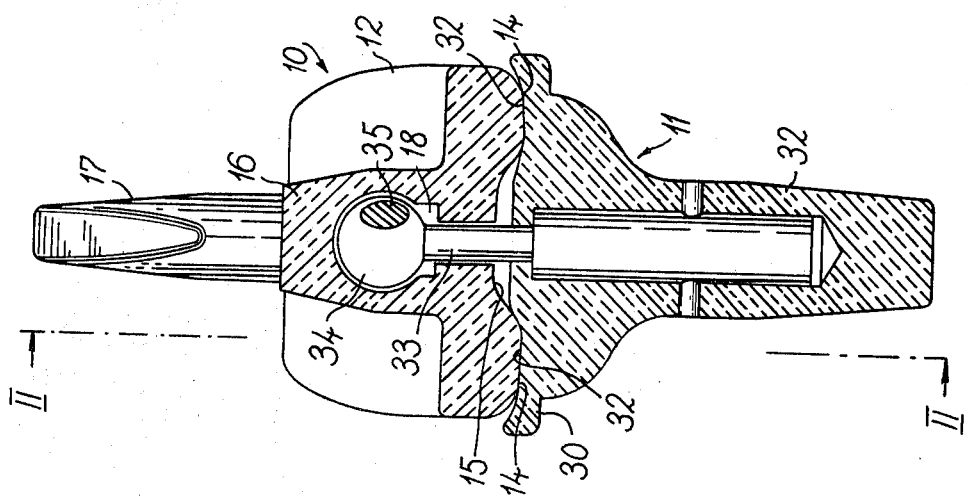
Figure 5:
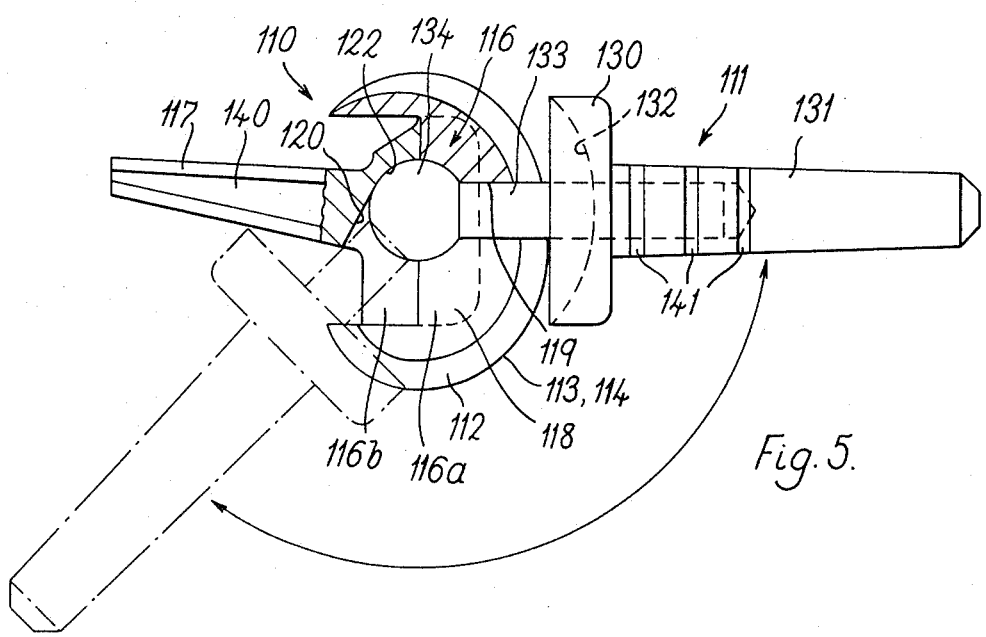
FIG. 5 illustrates another embodiment of a knee joint device according to the invention in a similar partly sectioned side view to that of FIG. 2.
Figure 6:
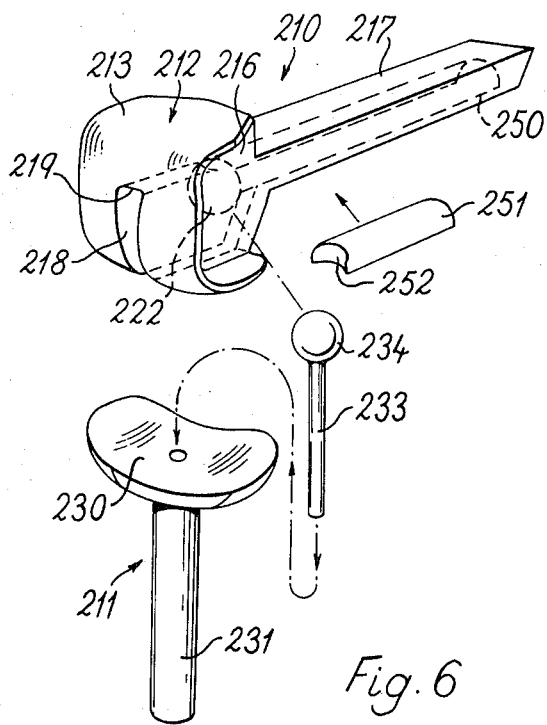
FIG. 6 illustrates an embodiment of a finger joint device according to the invention in an exploded perspective view.

It will also be seen that the radial surface 20 of the slot 18 differs from the surface 19 in that the former is associated with a widened portion or tunnel 21 extending along the relevant end of the slot. This tunnel has flat lateral walls along a first part extending from the mouth of the slot 18 (see FIG. 3), and then terminates in a cavity having enlarged, at least partly rounded side walls (see FIGS. 1 and 4).

Turning to consideration of the tibial component: this comprises a bearing member 30 in the form of a platform having a tapered intramedullary stem 31 projecting from one major surface of the platform. The other major surface of the platform defines the bearing surface of this component and, for this purpose, if formed with two spaced, smoothly concave depressions 32 which simulate the menisci in which the femoral condyles bear and, in this case, accordingly receive the convex bearing surface portions 14 of the femoral component.

A linkage member taking the form of a shaft 33 terminating at its free end in a ball-like head 34 is secured with the tibial component to project from the bearing surface of the platform 30 between the depressions 32. This ball-like head is not completely rounded, but is provided with two diametrally opposed, mutually parallel flats 35. More particularly, these flats are disposed equally about and parallel to an axial plane of the stem which is obliquely inclined relative to the lateral-medial and antero-posterior directions of the tibial component, suitably at about 45° to each of these directions.

The linkage member and slot of the associated components are so proportioned and dimensioned that the linkage member can be received in the slot by presenting the tibial component to the femoral component in such a disposition that the ball-like head 34 passes into the tunnel 21 of the slot 18 with their respective flat surfaces mutually adjacent, while the shaft 33 passes into the remainder of the slot. When the head reaches the enlarged part of the tunnel, the components can be rotated into alignment with the respective bearing surface portions 14 and 32 mutually engaged and the ball captively held in the tunnel over the range of pivotal movement between the bearing surfaces. As such movement occurs, the centre of the rotation varies because of the non-circular lateral curvature of the bearing surface portions 14, and this variation is accommodated by a corresponding movement of the linkage member head in the cavity.

It will also be apparent from the manner of linking the two components of the prosthesis that they can be relatively rotated around the longitudinal axis of the linkage member. in addition, the components can rock relative to one another in a lateral sense within the limits of the spacing between the linkage member shaft 33 and the side walls of the slot 18. Preferably this capability for lateral rocking is varied from a negligible amount of full extension to a progressively increasing amount with flexion to simulate the corresponding capability of the natural joint.

The second embodiment is similar to the first and, for convenience, the same reference numerals are used for corresponding items but these numerals are increased by 100 for purposes of distinction. However, there are differences between the two embodiments as will now be discussed.

Firstly, it is to be noted that the femoral component 110 has no tunnel in its sectoral slot 118, and the ball head 134 of the linkage member has no flats. In this case the linkage member is not secured with the tibial component, but is longitudinally slidably received in a bore in the tibial component. The linkage member still extends from the tibial component 111 in similar disposition to that in the first embodiment, but in this case in telescopic relationship therewith.

A related difference is that, instead of being separable from the fermoral component as in the first embodiment, the linkage member is captively held in such component in all positions of movement. For this purpose the web 116 of the femoral component is made initially in two parts 116a and 116b, of which the first is integrally formed with the bearing member 112, while the other is integrally formed with the stem 117. These two web parts together define opposing halves of the cavity 122 in which the linkage member head 134 is engaged, by assembly of the parts, and captively held, by securing the assembled parts 116a and 116b together during manufacture.

These related differences mean that one does not dispose the relevant bones in an unnatural angular configuration to couple the components during implantation, but instead one longitudinally separates the bones to engage the linkage member shaft in the tibial component bore, after individual securement of the components. This separation is possible with appropriate exposure of the implantation site but not otherwise, and the linkage member shaft will have a length of engagement in the tibial component bore which exceeds subsequent separation of the prosthesis by natural action.

Remaining differences in the second embodiment involve the provision of relatively low relief formations from the stems 117 and 131 to afford an enhanced key with cement for the purposes of securement of the components. This formation takes the form of trough-like depressions 140 extending longitudinally in the surface of the stem 117, and annular grooves 141 circumscribing the stem 131 in parallel manner orthogonal to the longitudinal axis of the stem.

With this embodiment, it is preferred that the tibial component be implanted first and then, with the joint fully flexed, the femoral component, while at the same time engaging the linkage member shaft with its bore and extending the joint.

While the third embodiment is intended as a finger joint device it is similar to the second embodiment and the same reference numerals are again used but with a further increase by one hundred for purposes of distinction. However, as before, there are differences in this third embodiment as will now be described.

In this case, access for the linkage member head 234 to slot cavity 222 is provided by grooving the stem 217 from one side thereof to communicate with the slot 218. This grooving is denoted at 250 and is sufficiently extensive laterally to allow access of the linkage member head 234 to the cavity 222 partly formed at the inner part of the slot 218 and, after rotation of the linkage member about its head to locate the shaft 233 in the slot 218, the groove 250 is filled by a plug member 251 secured therein in any suitable manner. The plug member 251 has a concavely dished end surface 252 which is located, during filling of the groove 250, to complete the cavity 222 and render the linkage member head 234 captive therein.

Another difference in this third embodiment is that the bearing surfaces 213 and 230 are of singular convex and concave form, respectively. This is appropriate to simulation of the bearing surfaces of the natural finger joint which does not have the double condylar form of the knee joint. Similarly bearing surfaces in this instance do not require non-uniform curvature in the direction of the slot 218.

A remaining difference relevant to a finger joint device is that the progressive widening along the slot 218 to allow lateral rocking is in the opposite sense to that in a knee joint device. This follows from the fact that lateral rocking capability in a finger joint increases as flexion decreases. However, it is to be noted that a progressive variation in slot width is not appropriate to an interphalangeal joint device since such joints function as a hinge with a single degree of freedom.

With this embodiment the components are implanted in similar manner to the last one except that the linkage member coupling is initiated at about 90° flexion.

While the invention has been described with more particular reference to the illustrated embodiments, it is not intended to be limited thereby. Indeed, these embodiments make clear the possibility of variations within the more general scope of the invention as defined by the appendant claims.

We claim:
1. A endoprosthetic bone joint device comprising:
   a first component having a convex bearing surface and a slot in such surface which slot terminates in an enlarged cavity within said first component remote from said surface;
   a second component having a concave bearing surface in mutual articulatory engagement with said convex surface;
   a linkage member projecting from said concave surface and located in said slot to limit the range of said engagement; and
   an enlargement at the end of said linkage member remote from said concave surface, which enlargement is housed in said cavity to hold said linkage member captively located in said slot over at least a major portion of said range; one of said components being formed with a passageway communicating with the exterior thereof, which passageway freely receives at least part of said linkage member and enlargement to allow separation of said components; said slot being of progressively varying width to afford a varying limit of articulation between said components in a direction transverse to said slot as the components articulate in the longitudinal direction of said slot.
2. A device according to claim 1 wherein said convex surface has varying curvature in the longitudinal direction of said slot.

3. A device according to claim 1 wherein said convex surface has generally spirally varying curvature in the longitudinal direction of said slot, with such curvature increasing as said slot becomes wider.

4. A device according to claim 1 wherein said passageway is formed in said second component and said linkage member is received in separable longitudinal sliding engagement therein.

5. A device according to claim 4 wherein said first component is of multi-part construction connected to form said cavity around said enlargement and render said linkage member captively located in said slot through said range of articulaton.

6. A device according to claim 1 wherein said passageway is formed in said first component at one end of said slot and communicates directly with said slot and said cavity to freely receive said linkage member and said enlargement therefrom at the corresponding limit of said range of articulation.

7. An endoprosthetic bone joint device comprising:
a first component having a first bearing surface and a slot in such surface, which slot terminates in an enlarged cavity located remotely within said first component from said first surface;
a second component having a second bearing surface in mutual articulatory engagement with said first surface, and a bore extending into said second component from its bearing surface; and
a linkage member including a shaft terminated at one end in an enlarged head, said head being captively movably housed in said cavity, part of said shaft adjacent said head being movably located in said slot, and the end of said shaft remote from said head being separably longitudinally slidably engaged in said bore.

8. A device according to claim 7 wherein said slot is of progressively varying width to afford a varying limit of articulation between said components in a direction transverse to said slot as the components articulate in the longitudinal direction of said slot.

9. A device according to claim 7 wherein said first bearing surface has convex for with increasing curvature in one sense along the longitudinal direction of said slot, and said slot has progressively increasing width in said one sense therealong to afford an increasing range of articulation in a direction transverse to said slot as said second component articulates relative to said first component in said one sense along said longitudinal direction.

10. An endoprosthetic bone joint device comprising:
one component having one bearing surface with a linkage member projecting therefrom; and
another component having a generally convexly curved bearing surface in mutual articulatory engagement with said one surface, and an elongated slot formed in said curved surface and receiving said linkage member therein, said slot having a length significantly greater than the transverse dimensions of said linkage member to allow mutual articulation between said engaged bearing surfaces in the longitudinal direction of said slot to simulate flexion-extension movement, said slot having progressively increasing width to allow mutual articulation between said engaged surfaces in the transverse direction of said slot to simulate abduction-adduction movement of an extent which varies with flexion-extension.

* * * * *